United States Patent [19]
Lambrecht et al.

[11] 4,008,609
[45] Feb. 22, 1977

[54] INDUCTIVE FLOWMETER

[75] Inventors: Josef Lambrecht, Porz-Eil; Klaus Mendte, Bensberg-Refrath; Rudolf Schmidt, Rosrath, all of Germany

[73] Assignee: Interatom, Internationale Atomreaktorbau GmbH, Bensberg, Cologne, Germany

[22] Filed: Oct. 2, 1975

[21] Appl. No.: 619,029

[30] Foreign Application Priority Data

Oct. 15, 1974   Germany ................ 2448945

[52] U.S. Cl. .................................. 73/194 EM
[51] Int. Cl.² ................................. G01F 1/58
[58] Field of Search ...................... 73/194 EM

[56] References Cited
UNITED STATES PATENTS

| | | | |
|---|---|---|---|
| 2,722,122 | 11/1955 | Soffel | 73/194 EM |
| 2,896,451 | 7/1959 | Rinia | 73/194 EM |
| 3,631,718 | 1/1972 | Sato | 73/194 EM |

FOREIGN PATENTS OR APPLICATIONS
1,914,335   12/1970   Germany ................ 73/194 EM

*Primary Examiner*—Charles A. Ruehl
*Attorney, Agent, or Firm*—Kenyon & Kenyon Reilly Carr & Chapin

[57] ABSTRACT

An inductive flowmeter with a permanent magnet is disclosed for electrically conductive liquids such as, for instance, sodium, comprising a pair of magnet poles which are disposed diametrically outside a pipe carrying the liquid, and electrodes which are conductively connected to the liquid. Through a new arrangement of the electrodes, not only the measured signal is increased but the dependence of the measured signal on the electric conductivity and the temperature of the liquid, is compensated.

4 Claims, 3 Drawing Figures

INDUCTIVE FLOWMETER

BACKGROUND OF THE INVENTION

This invention concerns an inductive flowmeter for electrically conductive liquids, with a pair of magnet poles which are disposed diametrically outside a pipe carrying the liquid, and with electrodes which are conductively connected to the liquid.

Such inductive flow meters consist essentially of a magnet whose magnetic field penetrates the pipe carrying the liquid to be measured, and of two electrodes which are conductively connected to the liquid to be measured and at which the measured voltage which appears perpendicularly to the magnetic field, is taken off.

Customarily, the pipes consist of an electrically nonconductive material, e.g., a ceramic, and the electrodes go through this material and protrude into the liquid. Such pipes, however, are not suited for transporting liquid metals, e.g., liquid sodium in nuclear power plants; only metallic pipes, i.e., practically only steel pipes, can be considered here. Although there are also induced in these pipes currents which have an adverse effect on the flow measurement, these currents are negligibly small if, as is customary in nuclear power plants, the pipes have a relatively large diameter (of, say, 600 mm). The cross section of the wall of the pipe is then only small as compared to the inside cross section of the pipe, and the higher conductivity of the liquid metal as compared to the conductivity of the pipe material also has an effect in the direction toward a relative reduction of such short-circuit currents. In such a case, it is advisable, if only to avoid a weakening of the pipe and also sealing problems, to attach, e.g., weld, the electrodes to the outside of the pipe in an electrically conducting manner.

In such flow meters, the difficulty arises that, when the electrically conductive liquid enters the magnetic field, currents are induced in it which have such a direction that the magnetic field produced by them counteracts and partly cancels the magnetic field of the magnet. When leaving the magnetic field, the induced currents have such a direction that the magnetic field formed by them is superimposed on the original field and reinforces the same. This difficulty can be circumvented if the length of the magnetic field is made large in the direction of the pipe axis and the electrodes are mounted approximately in the center of the magnetic field (German Auslegeschrift No. 1,220,160). With large pipe diameters, such a solution can be realized only with difficulty, particularly if a permanent magnet is to be used as the magnet. Inductive flow meters with permanent magnets are used by preference in nuclear power plants, because of their reliability and freedom of maintenance. They may be an important part of the operational instrumentation, for instance, at radiation-exposed and poorly accessible points of the sodium loops, and may in some circumstances intervene in the safety system of the reactor. The reliability of the permanent magnets is based primarily on the fact that the magnetic field is constant, independently of time. If suitable magnet alloys are used, also the influence of the temperature involved, remains within the permissible measuring accuracy. Permanent-magnet flow meters have no parts subject to wear.

In the German Offenlegungsschrift No. 2,225,356, an inductive flow meter with a permanent magnet is therefore described, in which it was attempted to circumvent the above-described difficulties of the weakening and reinforcing of the magnetic field at the ends of the magnet's field, by using a multiplicity of electrodes which are distributed on the pipe in the direction of the pipe's longitudinal axis. Their output voltages or currents are added together weighted. In such an arrangement a multiplicity of electrodes must be connected in parallel in order to obtain sufficient linearity between the measured signal and the flow rate, with short magnets and large pipe diameters. For this purpose, a very long straight section of pipe is required, which is not available in many cases. It is also difficult to fulfill the redundancy of the measuring signal, which is required for the safety system of a reactor.

In inductive flow-rate measurement, a further difficulty stems from the fact that the conductivity of the liquid changes with temperature. For most non-metallic liquids, it increases with temperature, and for metallic liquids, e.g., liquid sodium, it decreases. However, with increasing electric conductivity, the intensity of the interfering supplemental magnetic fields which appear at the ends of the magnet, increases, so that a separate characteristic is obtained for every temperature of the liquid. Particularly with large pipe diameters and a short magnet length, this phenomenon is very pronounced.

Care must further be taken in the design of inductive flowmeters that the measured signal is as large as possible and free of interference signals. In the arrangement according to U.S. Pat. No. 2,722,122, there is therefore provided, in addition to the pair of electrodes for the measuring signal, a second pair of electrodes which is mounted at those points of the pipe wall which are adjacent to the magnet poles, so that the line connecting the poles runs in the direction of the magnetic field lines. No measuring signal appears at these electrodes. The connecting lines of these auxiliary electrodes and the measuring electrodes are brought to an evaluation device in such a manner that stray interference signals are canceled.

It is an object of the present invention to create an inductive flowmeter which yields a large useful signal that depends linearly on the flow velocity. Its characteristic is to be independent of variations of the electric conductivity of the liquid to be measured and thus, of the temperature of the liquid.

SUMMARY OF THE INVENTION

In solving this problem, recognition of the fact was taken, as the basis, that in magnetic flow meters with a pipe of large diameter, the magnetic field strength drops in the center of the pipe because of the large air gap and as a consequence, the measured signal is not a maximum if the electrodes are arranged so that their connecting line runs through the center of the pipe and is perpendicular to the center axis of the magnet poles, but is if the electrodes are attached at the ends of a cord of the pipe cross section perpendicular to the center axis of the magnet poles.

Therefore, according to the present invention, if the circumference of the pipe is graduated so that the points of the pipe wall adjacent to the diametrically positioned magnet poles, are located at 90° and 270° respectively, two electrodes (E3, E4) are arranged at an angle of 0° and 180° respectively; and two electrodes of a second pair (E1, E2) are arranged with E1 at an angle $\alpha 1$ between 10° and 85° and E2 at an angle $\alpha 2$ between 95° and 170°. The electrode E2 may also be arranged diametrically to the electrode E1 at the angle $\alpha 2^* = 180° + \alpha 1$. As the magnetic field is symmetrical to the axis +90°/−90°, $\alpha 2$ may be not only $180° - \alpha 1$, but may also be $180° + \alpha 1$. Preferably the electrodes are positioned with E1 in the region of +45° and with E2 in the region of 135° or 215°, or, however, at 315° and 225° or 135°, respectively.

It has been determined by measurements that such an arrangement not only yields, with magnets of large nominal width, a larger measured signal, but that the characteristic as a function of the flow rate and the electric conductivity of the medium has better linearity. By suitably running the lines from the electrodes to the evaluation equipment, stray interference signals can be suppressed. By a bucking connection and appropriate weighting of the currents of both pairs of electrodes or by forming the difference of the voltages, respectively, the non-linear influences on the measured signal can be compensated.

If for any reason the positions at the center of the pipe at 0° and 180° for attaching the first pair of electrodes (E3, E4) are not available, then the electrodes of this pair can be arranged, according to a further embodiment of the invention, at an angle B1 between 95° and 170°. In that case, the two electrodes are always diametrically opposite each other, so that $B2 = 180° + B1$. The angles $\alpha 1$, $\alpha 2$ and B1, B2 must not be equal to each other.

BRIEF DESCRIPTION OF THE DRAWINGS

This invention as well as further advantages and additions will be described and explained in further detail in the following, making reference to the accompanying drawings, where.

DETAILED DESCRIPTION OF THE INVENTION

Figure 1:
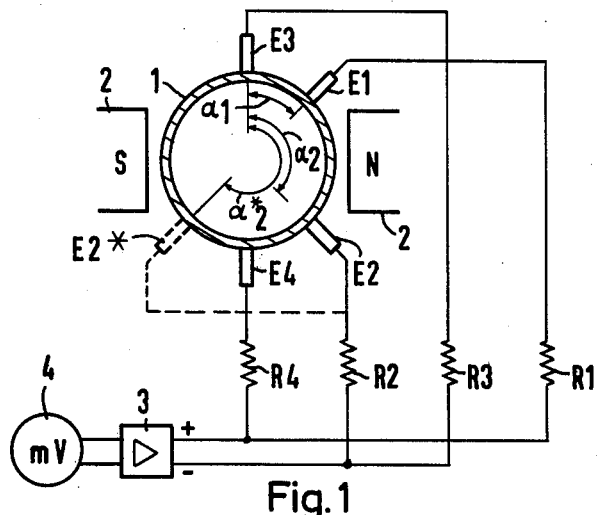
FIGS. 1 and 2 diagrammatically show two examples of inductive flow meters with the pipe shown in cross section in each instance.
Figure 3:
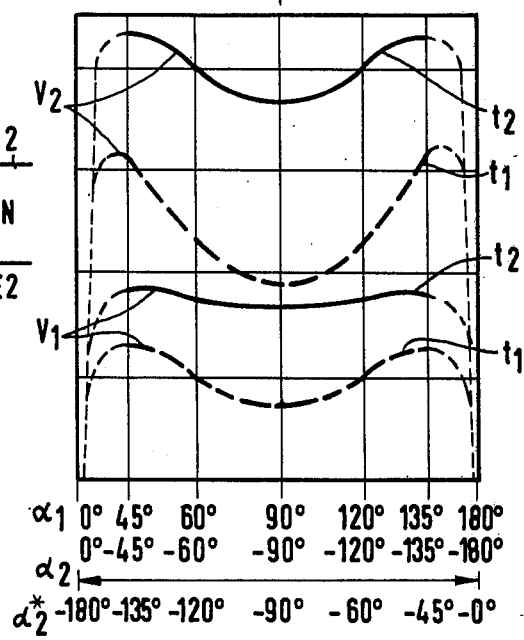
FIG. 3 shows graphically measured voltages appearing at the electrode pairs as a function of the flow velocity and the temperature of the liquid to be measured, as well as indicating the positions of the electrodes.

In the arrangement according to FIG. 1, a pipe is designated with 1, through which, for example, liquid sodium flows, the mean flow velocity of which is to be determined. The pipe 1 is traversed by a magnetic field which is produced by a magnet 2 with the poles N, S diametrically opposite to each other. Due to the induction law, a current then flows perpendicularly to the direction of flow and the magnetic field, i.e., from the bottom to the top in the drawings, which is partly picked up by the electrodes E1, E2 or E2* respectively, E3 and E4. First, it is assumed that the pair of electrodes E1, E2 can be shifted over the circumference of the pipe in such a way that $\alpha 1$ is always equal to $-\alpha 2$, and that the voltage appearing at the electrodes E1 and E2 is measured for different positions of the latter. Then the curves shown in FIG. 3 are obtained. The angles $\alpha 1$ and $\alpha 2$ are plotted on the abscissa, the reference line being the connecting line between the two poles. The ordinates give the measured voltages. It is noted that for the angles +90° and −90°, i.e., the conventional arrangement of the electrodes in inductive flowmeters, the measured voltages are smaller throughout than in other angular ranges. The dashed curves represent measurements at the temperature $t_1$, e.g., 200° C and the solid curves at the temperature $t_2$, e.g., 580° C. The two lower curves were recorded at mean velocities of $v_1 = 3$ m/s and the two upper ones at $v_2 = 5$ m/s. If one compares the measured voltages which were recorded with electrodes arranged at +45° with those that were obtained with electrodes arranged at ±90°, the following is found:

At low velocity ($v = 3$ m/s) and high temperature, i.e., low conductivity, as liquid sodium was chosen in the example, the drop at the center of the curve is relatively small. If the velocity of 3 m/s is maintained but the temperature lowered to 200° C, then the voltage between the electrodes E3 and E4 drops considerably more than between the electrodes E1 and E2. The measurement error will therefore be larger at the electrodes E3 and E4.

If the flow velocity is now increased to 5 m/s while a temperature of 200° C is maintained, the measured voltage increases for all possible electrode arrangements, but the voltage measured between the first pair of electrodes E2, E1 increases more and with a smaller non-linear error than the voltage measured by the second pair of electrodes E3, E4, as was found in other measurements, not shown in the figures. If the temperature is again increased to 580° C while a flow velocity of 5 m/s is maintained, the measured voltage at the second pair of electrodes E3, E4 increases by almost twice the amount than that measured at the first pair of electrodes E1, E2.

FIG. 3 shows therefore that, if the measuring electrodes are arranged at the circumferential angles +45° and −45°, the inductive flow meter is more sensitive than with the conventional electrode arrangement and that at the same time, the dependence of the measured voltage on the conductivity of the liquid becomes less. Furthermore, the non-linearity between the flow velocity and the measured voltage is less. If the electrode E2 is not attached at the arc angle $\alpha 2$, but as the electrode E2* at the angle $180° + \alpha 1$, then the same voltage is measured between the electrodes E1 and E2* as between the electrodes E1 and E2 because of the symmetry of the magnetic field with respect to the connecting line of the center axes of the poles N, S. Both electrode arrangements are therefore possible. The last-mentioned arrangement has the advantage that, as the electrodes E1 and E2* are disposed diametrically opposite each other, a possible out-of-roundness of the pipe has less influence on the quality of the measured signal.

In the arrangement according to FIG. 1, the measured voltage is not obtained with a single pair of electrodes, but by forming the difference of the voltages occurring at the pair E1, E2 and the pair E3, E4. For this purpose, the electrodes E1 and E2 are connected to the two inputs of a difference amplifier 3 via resistors R1 and R2. Similarly, the electrodes E3 and E4 are connected with the amplifier inputs via resistors R3 and R4, but in such a way that the voltage stemming from the electrode pair E3, E4 is subtracted from the voltage of the electrode pair E1, E2. The resistors R1 and R2 as well as the resistors R3 and R4 have the same respective values and are balanced so that the errors of the voltage appearing at the pair E1, E2 are compensated by the errors of the voltage at the electrodes E3, E4. In a practical example, the resistance ratio R1 : R3 = R1 : R4 = R2 : R4 was about 1.4. As the absolute errors of the voltage taken off at the electrodes E3 and E4 are larger than those of the voltage at the electrodes E1, E2, the resistances R3 and R4 are larger than the resistances R1 and R2. However, since the voltages at the electrodes E1 and E2 are larger than those at the electrodes E3 and E4, a sufficient measuring voltage, which is indicated on an indicating instrument 4, e.g., a millivoltmeter, remains at the input of the difference amplifier V in spite of the fact that the difference between the two voltages is formed. By forming the difference of the electrode voltages and by weighting them suitably, the influence of the induction currents at the ends of the magnet, which cause the non-linearity of the characteristic, are therefore canceled, and a linear characteristic of the flowmeter is thus obtained.

Figure 2:
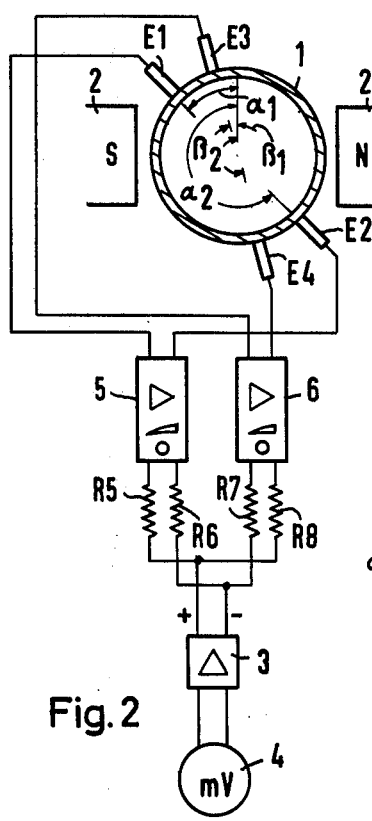

FIG. 2 shows an inductive flowmeter which again comprises a pipe 1, two magnet poles N, S and two pairs of electrodes E1, E2 and E3, E4. In contrast to the arrangement according to FIG. 1, the electrodes E3 and E4 are not arranged at the arc angles +90° and −90° but at another angle which, however, must be so different from the angles at which the electrodes E1 and E2 are arranged, that different voltages are picked up. An amplifier 5 and 6, respectively, with variable gain is connected to each pair of electrodes. In the amplifiers, the electrode voltages are weighted so by adjusting suitable gains, that the output voltages of the amplifiers have the same error voltages and the latter thereby cancel in the difference amplifier V. The resistors R5, R6, R7, R8 in the output circuits of the amplifiers 5 and 6 serve to compensate for the resistance differences in the measuring lines.

In all cases the magnet 2 is preferably a permanent magnet, for the reason previously described. Although only two poles, N and S, are illustrated, the magnet itself may be of bar shape having pole pieces, or of horseshoe shape, or other suitable form providing the two poles. An electromagnet can be used, as shown by the U.S. Pat. No. 2,722,122, previously discussed.

As previously indicated, the pipe 1 is made of metal such as steel, and the electrodes are welded to the outside of the pipe, all the electrodes and the axis of the magnetic field being positioned in the same radial plane and which plane is perpendicular to the pipe's axis.

What is claimed is:

1. An inductive flow meter for the flow of an electrically conductive fluid, comprising a metal pipe through which said fluid flows, north and south magnetic poles respectively positioned diametrically outside the pipe and forming a magnetic field having an axis extending through the pipe's inside perpendicular to the pipe's axis, a first pair of electrodes formed by two interspaced electrodes attached to the pipe's outside, a second pair of interspaced electrodes attached to the pipe's outside and means for measuring electric currents between said electrodes, wherein the improvement comprises:
   a. said second pair of electrodes being formed by first and second electrodes of which at least one is positioned at an angle substantially different than 90° around the pipe's circumference with respect to at least one of the electrodes of said first pair, all of said electrodes of said first pair and said second pair along with the axis of the magnetic field being positioned in substantially the same radial plane; and
   b. said means for measuring electric currents being a differential circuit weighted so that the difference currents between said electrodes depend substantially linearly on the flow rate of said fluid in the pipe.

2. The flowmeter of claim 1 in which with respect to said one of the electrodes of said first pair, said first electrode of the second pair is positioned at an angle around the pipe's circumference between 10° and 85°, and said second electrode of the second pair is positioned in the same direction around the pipe's circumference, at an angle of between 95° and 170°.

3. The flowmeter of claim 1 in which with respect to said one of the electrodes of said first pair, said first electrode of the second pair is positioned at an angle around the pipe's circumference between 10° and 85°, and said second electrode of the second pair is positioned diametrically opposite to the just-named first electrode.

4. The flow meter of claim 1 in which said north and south magnetic poles are the north and south magnetic poles of a permanent magnet.

* * * * *